June 2, 1942.   D. M. GANS ET AL   2,285,115
METHOD OF MANUFACTURING CHROME YELLOW PIGMENTS
Filed Jan. 18, 1939

INVENTORS
DAVID M. GANS
BY CLINTON GROVE
ATTORNEY

Patented June 2, 1942

2,285,115

UNITED STATES PATENT OFFICE 2,285,115

METHOD OF MANUFACTURING CHROME YELLOW PIGMENTS

David M. Gans, Bronx, N. Y., and Clinton Grove, Westfield, N. J., assignors to Interchemical Corporation, New York, N. Y., a corporation of Ohio Application January 18, 1939, Serial No. 251,566

4 Claims. (Cl. 23—57)

This invention relates to chrome yellow pigments, and has particular reference to a new and improved method of making such pigments, characterized by precipitation of the pigment under substantially constant conditions throughout the course of the precipitation.

In the manufacture of chrome yellow pigments it is conventional practice to precipitate a solution of a soluble lead salt with a solution of a soluble chromate or bichromate (and sulfate in the case of light chrome yellows) running the bichromate solution into the lead solution with each at the desired temperature and a predetermined pH. The precipitated slurry in the vat will generally contain a slight excess of soluble lead in the case of the light shades and of soluble chromate (or bichromate) in the case of the medium shades of chrome yellow. Treatment with chemical agents and at predetermined temperatures and pH's finishes the color, which is washed and pressed, and, if the dry color is required, dried and pulverized.

We have discovered that chrome yellow of improved color strength and light fastness can be prepared, by conducting the reaction under substantially constant conditions throughout the course of the reaction. In order to keep the conditions constant, we run separate streams of chromate or bichromate solution and lead salt solution into a mixing chamber in predetermined volume relationship, constantly removing the overflow into a finishing vat, where a completely precipitated batch may be treated to obtain any desired end point.

In the manufacture of medium chrome yellows by our process, we have found that a controlled excess of chromate ions is essential throughout the precipitation, if good color strength, cleanness of color and good light stability are to be obtained. An excess of at least about four percent of chromate over theoretical is essential if pigment with all of these properties is to be produced; larger excess are not harmful, but are undesirable because of the additional cost.

The process may be carried out in any convenient apparatus. A simple form is shown in the accompanying drawing, in which—

Figure 1:
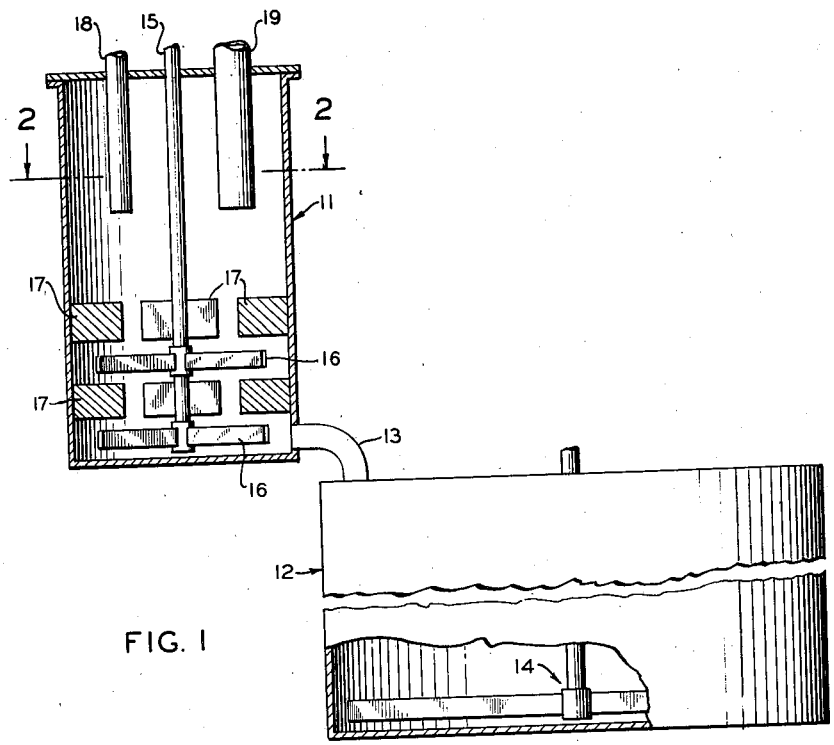
Fig. 1 is a side sectional view of the apparatus.
Figure 2:
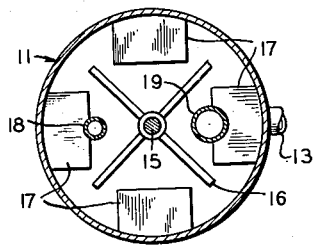
Fig. 2 is a partial top view, showing the baffle arrangement.

The apparatus comprises a small precipitating tank 11 and a large finishing vat 12, connected by an overflow pipe 13. The finishing vat is supplied with a conventional slow speed stirrer, 14.

The tank contains a high speed stirring device 15, with stirring paddles 16 so arranged between baffles 17 as to provide for complete and rapid admixture of solutions which may be fed into the tank by means of pipes 18 and 19.

In the practice of our invention, we feed a stream of chromate solution, at a predetermined rate, to one of the pipes, and a stream of lead liquor through the other pipe. These are thoroughly admixed in the tank 11, and the slurry containing the precipitated pigment is discharged into the tank 12, where it may be finished as desired. By providing a plurality of finishing tanks, the process of precipitation can be made practically continuous.

As a typical example of our invention, we prepared 400 gallons of basic lead acetate solution containing 440 pounds PbO and 84 pounds of acetic acid, and 160 gallons of sodium bichromate solution containing 320 pounds of $Na_2Cr_2O_7.2H_2O$. The lead solution (at 100° F.) and the bichromate solution (at 55° F.) were then fed simultaneously into the strike tank 11, in the ratio of 5 gallons basic lead acetate to 2 gallons of bichromate solution, the precipitation conditions thus being held relatively constant at a pH of 9.0, and 5% excess chromate (the bichromate being converted to chromate under the alkaline conditions) over that necessary to produce normal lead chromate. The entire amount of raw material was precipitated in about 40 minutes. The precipitated color was collected in the finishing tank 12, in which the stirrer was kept going, until the last of the batch was delivered, and was then washed by decantation.

A light orange-yellow pigment may be obtained by merely filtering the washed product; while greener modifications can be obtained by adding sulfuric acid to the batch. We find that a very good greenish medium yellow can be obtained at a pH of about 4.5 in the finishing operation.

The press cake obtained by filtering the pigment is milled and dried in conventional fashion.

The process can be carried out with variations in the chromate solutions and in the lead solutions as desired, and various results are obtained by varying the types of solution and the physical conditions and chemical treatments.

We claim:

1. The method of making pigments of the medium chrome yellow group which comprises simultaneously feeding a stream of a solution of a chromate, in a continuously liquid form, and a stream of a solution of a lead salt, in a continuously liquid form, into a container while maintaining a substantially constant ratio between the amounts fed, which ratio provides at least four percent excess of chromate ion over that necessary to produce normal lead chromate, mixing the streams while in liquid form as they are fed into the tank, and withdrawing the mixture at substantially the rate of feeding.

2. The method of claim 1 in which the lead solution is basic lead acetate solution and the chromate solution is sodium bichromate solution.

3. The method of claim 1 in which the lead solution is basic lead acetate solution and the chromate solution is sodium bichromate solution, and the mixture has a pH of 9.0 as it is withdrawn from the container.

4. The method of making pigments of the medium chrome yellow group which comprises simultaneously feeding a stream of a solution of a chromate, in a continuously liquid form, and a stream of a solution of a lead salt, in a continuously liquid form, into a container while maintaining a substantially constant ratio between the amounts fed, which ratio provides at least four percent excess of chromate ion over that necessary to produce normal lead chromate, mixing the streams while in liquid form as they are fed into the tank, withdrawing the mixture at substantially the rate of feeding, adjusting final conditions to produce the desired shade of color, and filtering and washing the precipitated pigment.

DAVID M. GANS.
CLINTON GROVE.